United States Patent [19]

Mladjan et al.

[11] Patent Number: 5,737,119
[45] Date of Patent: Apr. 7, 1998

[54] THERMAL IMAGING DEVICE

[75] Inventors: Gary Mladjan, Torrance, Calif.; Peter Menard, Penetanguishene, Canada

[73] Assignee: Hughes Electronics, Los Angeles, Calif.

[21] Appl. No.: 524,448

[22] Filed: Sep. 6, 1995

[51] Int. Cl.$^6$ .................. G02B 15/14; G02B 23/00; G02B 15/22; G02B 26/10
[52] U.S. Cl. .................. 359/353; 359/350; 359/421; 359/706; 250/330; 250/334
[58] Field of Search .................. 359/350, 353, 359/354, 695, 698, 403, 421, 701, 702, 703, 706, 819, 420, 432; 250/330, 331, 332, 333, 334

[56] References Cited

U.S. PATENT DOCUMENTS

| | | |
|---|---|---|
| 3,781,559 | 12/1973 | Cooper et al. |
| 3,941,923 | 3/1976 | Wheeler .................. 250/330 |
| 5,121,220 | 6/1992 | Nakamoto . |
| 5,548,442 | 8/1996 | Devenyi et al. .................. 359/432 |

FOREIGN PATENT DOCUMENTS

| | | |
|---|---|---|
| 0273381 | 6/1988 | European Pat. Off. |
| 0534439 | 3/1993 | European Pat. Off. |
| 2-085184 | 4/1982 | United Kingdom . |

*Primary Examiner*—Paul M. Dzerzynski
*Assistant Examiner*—Audrey Chang
*Attorney, Agent, or Firm*—Gordon R. Lindeen, III; Michael W. Sales; Wanda K. Denson-Low

[57] ABSTRACT

A thermal imaging device (10) receives thermal infrared radiation from a viewed scene and responsively provides a visible image replicating the viewed scene. The imaging device (10) has a main housing with an optical aperture (16) at which a lens assembly (12) is attached. The lens assembly (12) has a number of lenses (200, 204, 208, 212, 216) sequentially mounted within a cylindrical housing (146), and defining an optical axis (199). A field-of-view-change mechanism (228) allows a user to select a wide field of view or a narrow field of view. The field-of-view-change mechanism (228) includes a rotatable field-of-view (FOV) ring (226) which rotates a tumbler (210) with a pair of lenses (208, 212) mounted therein. The tumbler (210) is positioned between a first position providing a wide field of view and a second position providing a narrow field of view. A rack (236) cooperates with the FOV ring (226) and the tumbler (210) so that rotation of the FOV ring (226) about a first axis (199) rotates the tumbler about a second axis (210') perpendicular to the first axis (199). An optical alignment mechanism (254) releasably retains the tumbler (210) in the first and second positions so that optical axes (199', 248') of the tumbler are respectively aligned with the optical axis (199) of the lens assembly (12).

16 Claims, 6 Drawing Sheets

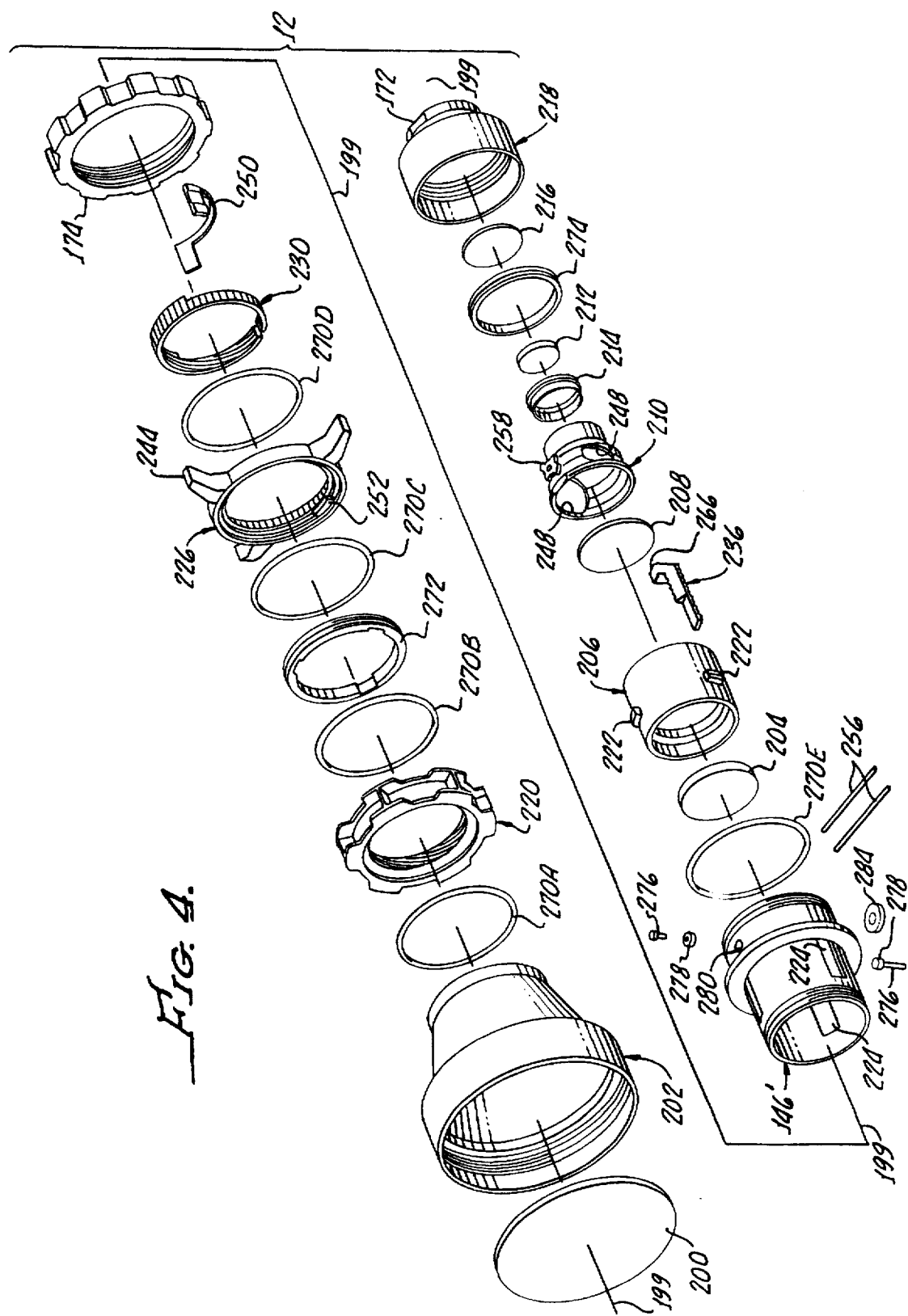

THERMAL IMAGING DEVICE

This invention was made with government support under Contract No. DAAB07-91-C-K254 awarded by the Department of Army. The Government has certain rights in this invention.

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes) or invisible near-infrared light in a first frequency band, and responsively providing a greatly intensified visible image in a phosphorescent monochrome yellow-green light.

Such an image intensifier night vision devices convert available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in near-infrared radiation, which is invisible to the human eye. The present generation of night vision scopes use a photoelectrically responsive "window", referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the view scene across the detector. In either case, because the detector is cooled to cryogenic temperatures, it can proved an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

A device of this category is known in accord with U.S. Pat. No. 4,873,442, issued Oct. 10, 1989 to Robert W. Klatt (hereinafter, the '442 patent). The device of the '442 patent uses a sensor with a linear array of elemental detectors each spaced apart from the next-adjacent detector element by a distance about equal to the size of the detector elements themselves along the length of the linear array. Accordingly, the sensor could capture about half of the image information from a scene or object space with each field, or scan of the sensor across the object space. However, in order to detect and compensate for non-uniformity in responsivity of the detector elements, the '442 patent teaches to overlap the scan lines of all of the detector elements in successive scan fields so that each field is missing image information from at least one detector element. That is, no field of the '442 patent uses all of the detector elements to respond to signal (image information) from the scene. At least one detector element at one end of the linear array scans a space outside of the object space and provides no useful image information. According to the example set forth in the '442 patent, each field is missing a fractional part of its maximum possible image information, which fraction is equal to 1/n, where n is the number of detector elements. The remaining n−1 detector elements are used to capture half of the image information from the object space for each field. Each field thus presents 90 percent of the image information that it could contain were all detector elements used. Accordingly, each frame of two fields of the '442 patent presents a complete object space image, but represents only 90 percent of the image information which it could provide were all of the detector elements used in each frame. Additionally, the possible number of lines of resolution which the sensor can provide is not fully used by the '442 patent.

A further significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

SUMMARY OF THE INVENTION

In view of the deficiencies of the conventional technology, a primary object for this invention is to overcome one or more of these deficiencies.

Another object for the present invention is to provide a thermal imaging device which receives infrared radiation from a viewed scene and responsively provides a visible image replicating the viewed scene.

Still another object for this invention is to provide such an infrared imaging device having a lens assembly which allows a user to select either a wide field of view or a narrow field of view, with each field of view having a corresponding telescopic power.

According to one aspect, the present invention provides a thermal imaging device including a thermal imaging device including a housing having an optical aperture for receiving thermal infrared radiation from a scene, and responsively providing a visible image replicating the scene, the thermal imaging device comprising: a telescopic variable-power lens assembly cooperable with the imaging device at the optical aperture for conducting thermal infrared radiation from the scene to the thermal imaging device, the lens assembly including a lens housing passing the thermal infrared radiation from the scene along an optical axis to the imaging device, a movable member mounted within the lens housing, the movable member carrying at least one lens, in a first position of the movable member the at least one lens being in the optical axis so that the thermal infrared radiation passing to the imaging device passes through the at least one lens, and the movable member in a second position disposing the at least one lens out of the optical axis.

An advantage of the present invention is that a user is easily able to switch between fields of view (with each field of view having an attendant telescopic power) while viewing a scene, and without the necessity of changing the telescopic lens assembly itself. The tumbler is releasably retained in either one of the two available field-of-view positions so that the tumbler will not be misaligned with the optical axes of the lens assembly. Further, the tumbler rotates approximately 90 degrees between its two alternative positions with only a 30-degree rotation of the FOV ring being required. Additionally, the FOV ring has a plurality of radially-extending levers, which are tacitly different from other components of the lens assembly so that a user can readily distinguish the FOV ring at night and can also operate the FOV ring while wearing gloves, mittens, or the like.

These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DESCRIPTION OF THE DRAWING FIGURES

FIG. 1 provides a diagrammatic representation of the functionally cooperating physical components of a thermal imaging device embodying the invention;

FIG. 2 is a schematic block diagram of a thermal imaging device according to the present invention;

FIGS. 3a and 3b respectively provide an external view and an exploded perspective view of a thermal imaging device embodying the invention;

FIG. 4 is an exploded perspective view of a lens assembly according to the present invention;

DETAILED DESCRIPTION OF AN EXEMPLARY PREFERRED EMBODIMENT OF THE INVENTION

An overview

Figure 1:
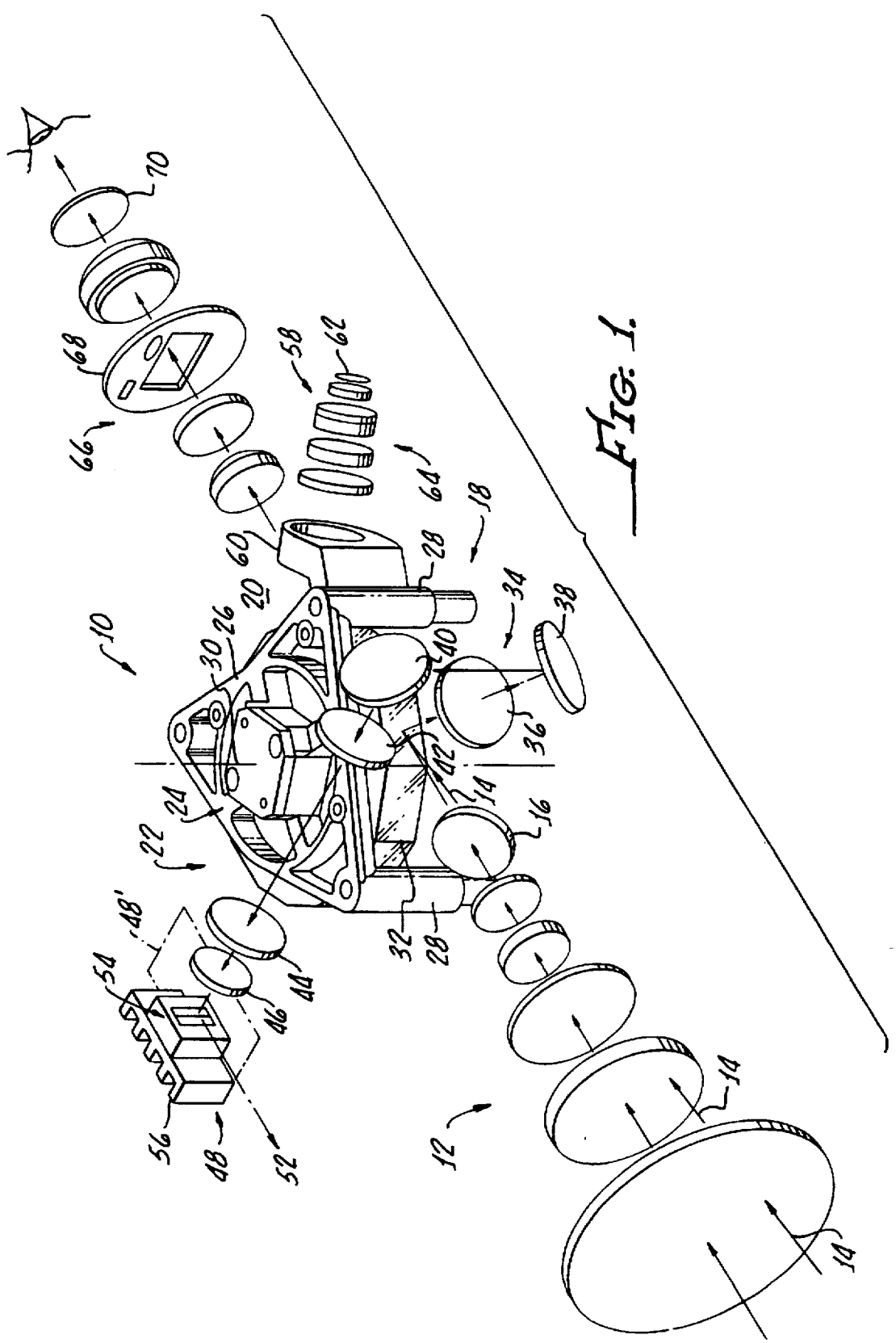

Viewing FIG. 1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (generally indicated with reference numerals 12', 12", 12'", etc.), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and columnates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets or faces 32a, 32b, etc. only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets 32a, 32b, etc., continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly-arrayed multitude of small infrared detector elements, indicated collectively on FIG. 1 with the vertical line 50' on detector 50. Each of the detector elements 50' of the detector 50 provides a corresponding one of a like multitude of electrical signals each of which is indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet 32a, 32b, etc., of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LED's (not visible in FIG. 1, but indicated with the arrowed numeral 62'), each individually emitting visible light when energized. The LED's 62' of the array 62 are arrayed linearly along a vertical line similarly to the linear arrangement of the detector elements 50' of the detector 50. The LED's 62' provide respective portions of a visible image, as will become apparent. Light from the LED's 62' is columnated and projected by a projection lens group, generally indicated with the numeral 64, onto a facet of the mirror 32, and as indicated by the arrowed reference numerals 14'. The numerals 14 and 14' are used intentionally with respect to the invisible infrared light carrying image information from a scene, and the visible light replicating the scene for viewing by a user of the device 10.

From the mirror 32 (i.e., from a particular facet 32' of this mirror) the visible light from the LED's 62' is reflected to an ocular lens group, generally indicated with the numeral 66. The ocular lens group 66 includes several individual lenses, indicated with the respective reference numerals 66', 66", etc. Along with these lenses 66', 66", etc., a status display unit 68 is interposed in the ocular lens group 66. This status display unit 68 defines an aperture through which the visible image is perceived, and includes several individual LED's which when illuminating are peripherally visible to the user of the device 10. These individual LED's are indicated with the numerals 68', 68", etc. Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
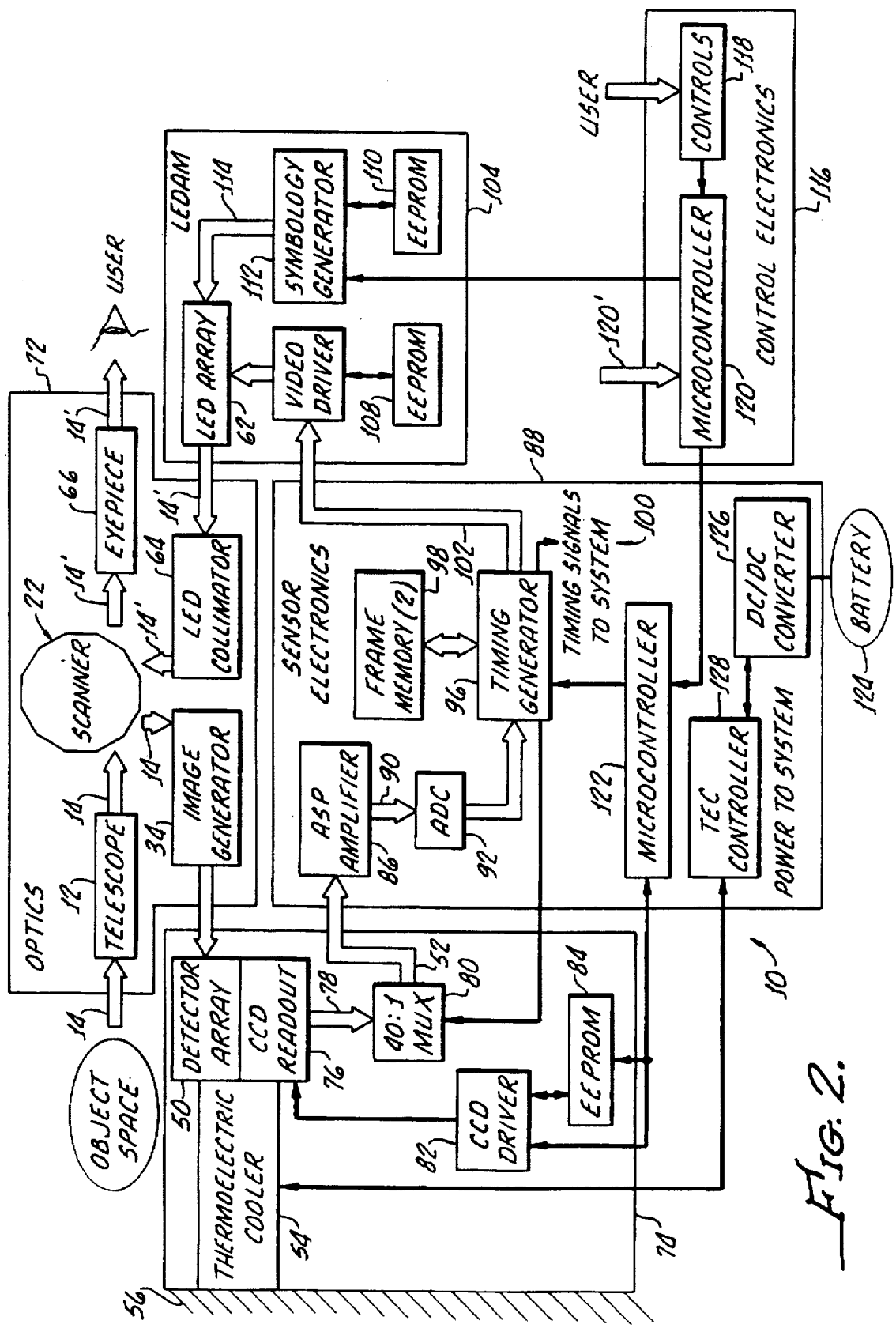

Viewing now FIG. 2, a schematic functional block diagram of the thermal imaging device 10 is presented. This thermal image device 10 is divided into functionally modular portions, as is indicated by the dashed-line boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LED's 62' in response to this signal. An electrically erasable programmable read-only memory (EEPROM) 108 has an interface with the driver circuit 106 for receiving and storing for future use values to be used in the operation of the device 10. For example, EEPROM 108 may be used to store stadia line spacing information, which would allow the device 10 to be used to estimate ranges to personnel or vehicles of known sizes. In order to provide a user of the imaging device 10 with additional useful image information, such as spaced-apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LED's) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 118, which is part of a distributed control system also including another microprocessor 122 in the P&C module 88. The microprocessors 120 and 122 have an interface with the EEPROM's 84, 108 and 110, along with the circuits served by the data and commands stored in these EEPROM's. The microprocessor 120 has an externally-accessible data interface port 120' so that all of the data and programming stored in the microprocessors 120, 122, and the EEPROM's interfaced with these microprocessors, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Figure 3A:
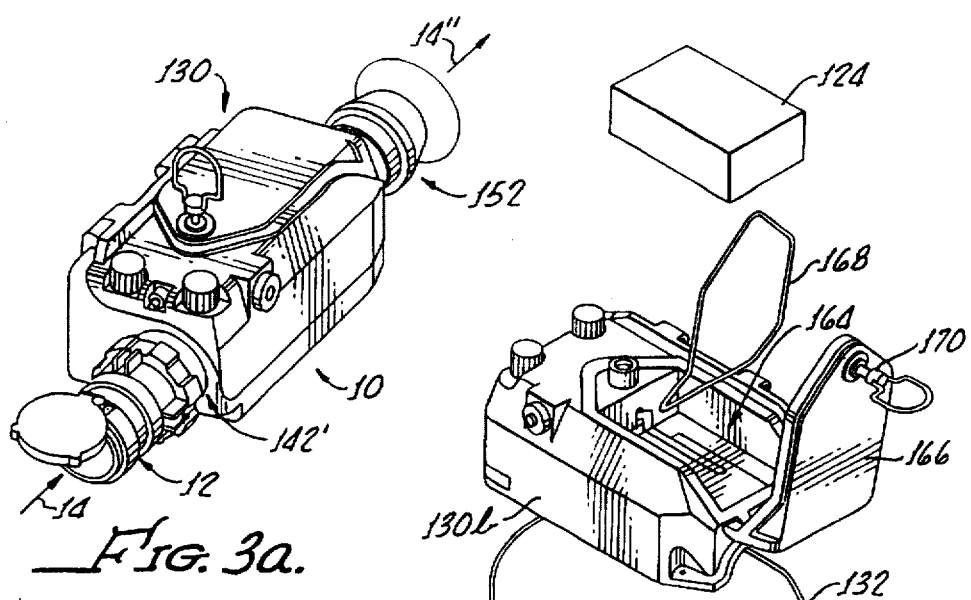
Figure 3B:
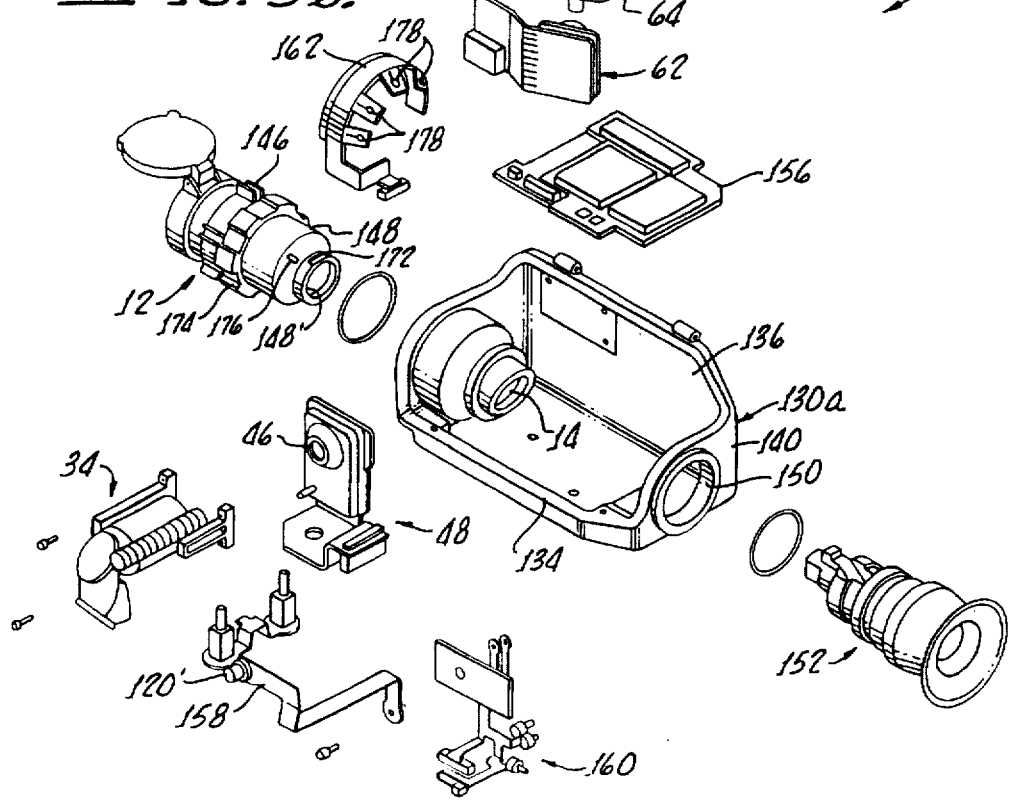

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a re-entrant portion 142 which forwardly defines a somewhat conical recess (not visible in the drawing Figures), and which at its aft end carries the window 16 in the aperture 144 of this wall. The objective optics group 12 is carried at this front wall 138 by a housing 146 which at its aft end defines a conical portion 148 for receipt into the front recess of the housing part 130a. The housing 146 is removably engageable with the housing part 130 to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discreet and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the re-entrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b. A latching device 170 is carried by the door 166 adjacent to its forward end, and is removably engageable with a recess feature of this housing part to retain the door 166 in its closed position, as is seen in FIG. 3a.

Telescope Module with Changeable Field of View

Figure 5:
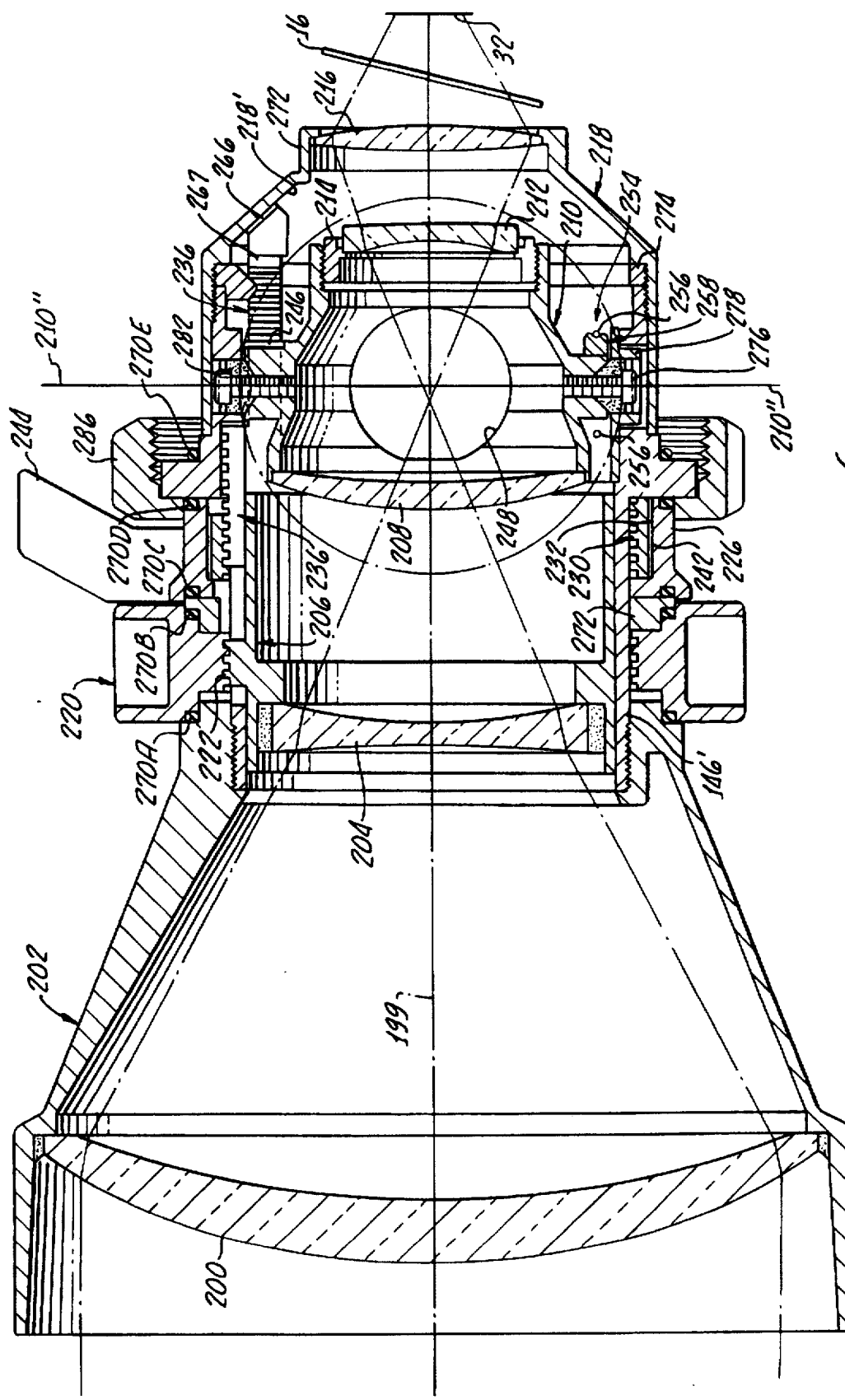
FIG. 5 is a cross-sectional view of a lens assembly shown in an exemplary embodiment of the present invention.

Turning attention to FIGS. 4 and 5, and recalling FIGS. 1, 3a, and 3b, the objective optics group or telescope module 12 is shown in detail. The telescope module 12 is releasably mountable to the front of the housing 130 with the conical rear portion 148 of the telescope module housing 146 inserted into a matching cavity of the housing 130, as explained above. FIG. 3b particularly shows that the conical rear portion 148 carries a flat feature 172 defined on the conical portion 148 so that the housing 146 can be fully seated into the thermal imaging device 10 in only one relative rotational position. An internally threaded retaining ring 174 rotationally carried by the housing 146 threadingly engages a threaded annular boss (not visible in the drawing Figures) on the front of the housing 130 to releasably retain the telescope module 12.

Any number of telescopic accessory lens modules 12 may be selectively used with the thermal imaging device 10. It is seen that the accessory telescopic lens module 12 in FIGS. 3 has a magnet 176 disposed on the housing 146 at a location particular to that specific telescopic module (i.e., the magnet 176 is uniquely positioned circumferentially of the housing portion 148 relative to the flat feature 172). The magnet 176 of the particular lens assembly 12 aligns with and actuates only one of the magnetic reed switches 178 disposed on the reed switch assembly 162. The reed switch 178 which is actuated by the magnet 176 uniquely identifies the installed telescopic lens 12. Other compatible telescope lens modules (not shown) likewise have a magnet positioned differently and uniquely relative to the flat feature 172 so as to actuate only a corresponding one of the four (or other preferred number of) reed switches 178 of the reed switch assembly 176.

In addition to the housing 146, the lens assembly 12 includes a number of lenses, a focussing mechanism, and a bi-positional field-of-view change mechanism, which will be further described. The bi-positional field-of-view change mechanism selectively provides for the user of the device 10 to have either one of two alternative fields-of-view of the viewed scene. Understandably, each particular field of view provides a corresponding telescopic power for the device 10. That is, if the user wants a wide field of view, a lesser telescopic power will be provided. On the other hand, if greater telescopic power (i.e., an apparently larger image of a distant object in the viewed scene) is desired, the user will be provided with a narrower field of view.

It is noted viewing FIG. 4 that the majority of the components of the telescope module 12 are generally cylindrical. That is, this assembly is made of components each having an inner and an outer diameter and an axial center. The common axial center defines an optical axis for the lens assembly 12. This optical axis in generally indicated with the numeral 199 and is defined longitudinally through the objective optics group. In the exemplary embodiment shown, five lenses are provided in the telescope module. However, a greater or lesser total number of lenses may be provided without departing from the present invention. More specifically, the telescope module 12 sequentially includes (from front to most rear), a first lens 200 mounted within a front telescope barrel 202, a second lens 204 mounted within a focus cell 206, a third lens 208 mounted within a forward end of a tumbler 210, a fourth lens 212 mounted within a cell 214 carried at the rear end of the tumbler 210, and a fifth lens 216 mounted within a rear cap 218 of the housing 146. The lenses 200, 204, 208, 212, and 216 may be retained within their respective mounts by known retaining means such as retaining rings or the like. As will be appreciated by those skilled in the art, the telescope module 12 may be designed to have any number of lenses for a particular application or magnification, as mentioned above.

In addition to the focus cell 206, the focussing mechanism of the telescopic module 12 includes a focus ring 220. The focus cell 206 is concentrically and slidably received within a tubular base portion 146' of the housing 146, and has a plurality of threaded projections 222 received within and projecting radially outwardly through longitudinal slots 224 formed in the wall of the base housing portion 146'. The focus ring 220 has inner threaded surface 220' which engages with the threaded projections 222 such that as the focus ring 220 is manually rotated by a user of the device 10, the focus cell 206 with the second lens 204 moves axially within the base housing portion 146' (it being understood that the focus ring 220 is constrained form axial movement along the outside of the base portion 146'). This construction allows the user of the deice 10 with a telescope assembly 12 installed to focus the telescope module 12 simply by manually rotating the focus ring 220.

As mentioned above, the telescope module 12 also includes a two-position variable-power feature. That is, the field of view of the telescope module 12 is changeable, with attendant change of the telescopic power provided. Generally speaking, the width of a field-of-view provided by a telescope with a particular size of objective lens is inversely proportional to magnification (telescopic power). Accordingly, if a user desires a larger (i.e., wider) field of view, the magnification needs to be decrease, and vice versa. This two-position variable power feature is actuated by the user manually by rotating a power-select/field-of-view (FOV) change ring 226. The FOV ring 226 is rotationally carried on the base housing portion 146' behind the focus ring 220 (i.e., closer to the housing 130 and the user), and is similarly constrained from axial movement along the outside of this housing portion.

Preferably, the FOV ring 226 is movable between, and may be selectively positioned in either one of, two rotational positions around the base housing portion 146', with each position being only about 30 degrees of rotation of the FOV ring 226 away from the other position. One of these positions provides a wide field of view and corresponding low magnification (e.g., 2 power) of the viewed scene, while the other position provides a narrower field of view and corresponding higher magnification (e.g., 3.3 power). By rotating the FOV ring 226 about 30 degrees about one axis (i.e., the longitudinal optical axis of the telescope module 12), the tumbler 210 with the third and fourth lenses 208 and 212 pivots through 90 degrees about another axis 210' (seen on FIG. 4) perpendicular to the optical axis of the telescopic lens group 12, and perpendicular to the axis of rotation of the FOV ring 226. Furthermore, it is preferable for a rotation of approximately 30 degrees of the FOV ring 226 to induce a 90-degree rotation of the tumbler 210 (or other pivoting movement of the tumbler 210 sufficient to change the FOV and power of the telescopic lens assembly 12), which will be discussed in more detail below.

Figure 6:
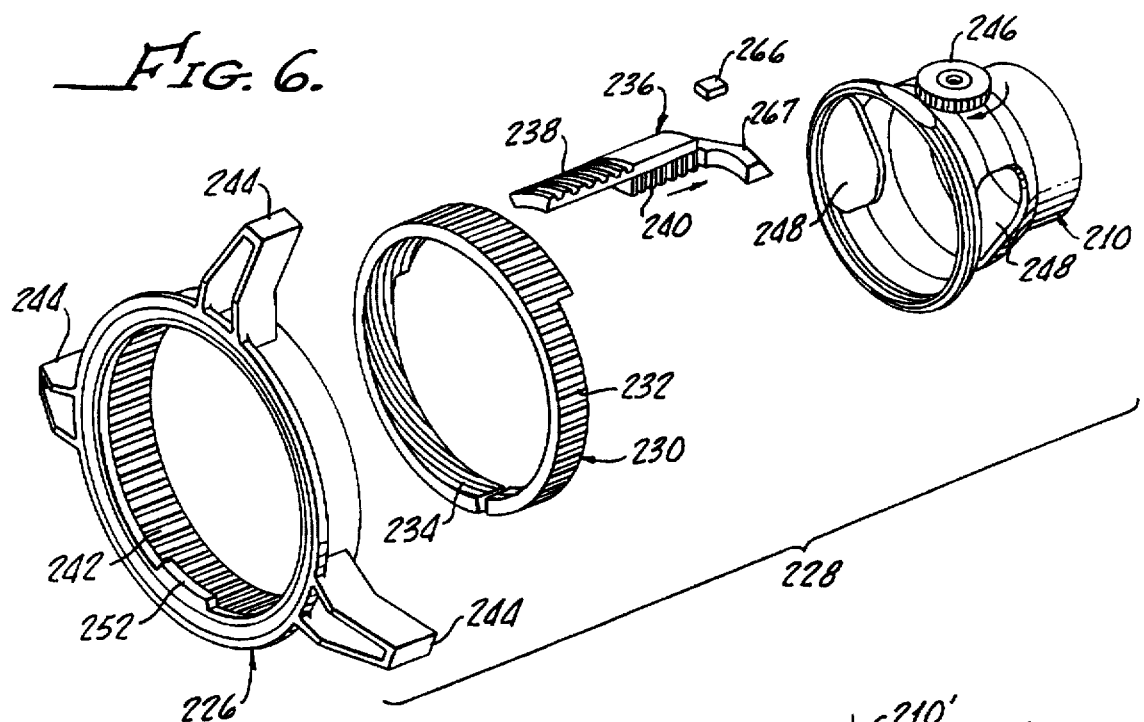
FIG. 6 is an exploded perspective view of a portion of a lens assembly particularly illustrating the field-of-view change mechanism according to one embodiment of the invention.

With reference now to FIG. 6, a field-of-view change mechanism 228 is shown in detail. In addition to the tumbler 210 and the FOV ring 226, the FOV change mechanism includes a drive helix ring 230, and a rack member 236. The drive helix ring 230 has a serrated outer periphery 232 and multi-start inner thread surface 234. Cooperatively, rack member 236 defines an arcuate thread surface 238 projecting radially outwardly through a corresponding longitudinal slot (not seen in the drawing Figures) defined by the base housing portion 146', and engageable with the inner thread surface 234 of the drive helix ring 230. The rack member 236 also included a longitudinally-disposed rack gear surface portion 240 disposed circumferentially of the housing portion 146' (i.e., as opposed to the radially outward extension of the thread surface 238).

The FOV ring 226 has an inner serrate surface 242 which is compatible to and drivingly engages with the serrate outer peripheral surface 232 of the drive helix 230. Consequently, it is understood that the drive helix 230 is secured concentrically within the FOV ring 226 and is prevented from rotational movement relative thereto. On the other hand, both the drive helix ring 230 and FOV ring are nested radially and are rotational together about the outer surface of the base housing portion 146'. The FOV ring 226 also has a plurality of radially outwardly extending projections, or levers, 244 projecting radially from an otherwise ring-like periphery thereof so as to facilitate handling and rotation by both left-handed and right-handed users. These radially extending lever parts 244 impart a unique tactile feel to the FOV ring, making it easily identified by touch alone in contrast to the generally cylindrical outer surface of the telescope assembly 12 (and in contrast to the retaining ring 174 and focus ring 220).

Further, the FOV ring 226 is purposely tacitly very dissimilar to the focus ring 220 for easy discrimination by touch only, even if a user is wearing gloves, mittens, or the like. Thus, at the time of assembly of the telescope 12 and at the time the surfaces 232 and 242 are engaged, the FOV ring 226 is rotationally adjusted to a selected position relative to the thermal imaging device 10 by rotation relative to the drive helix ring 230. The FOV ring 226, and the radially projecting levers 244 thereof, is thus rotationally adjusted relative to the position of the helix drive ring 230 so that the users of the device 10 will encounter these levers in consistent rotational positions regardless of which telescope assembly 12 is in use on the device 10, and with consistent rotational positions for both the wide field of view operation and for telescopic operation. FOV ring 226 may be positioned in either of the two alternative positions for field-of-view settings of the assembly 12.

The tumbler 210 carries the third lens 208 at a forward end and the fourth lens 212 at a rearward end, as mentioned above. These lenses 208 and 212 define a first optical axis of the tumbler 210 indicated with the numeral 199', in the position of this tumbler seen in FIGS. 4, 5, and 7 (i.e., coincident with axis 199). This first position for the tumbler 210 aligns its first optical axis 199' with the optical axis 199 of the assembly 12. The tumbler 210 carries a disc-shaped field-change gear 246 disposed on an outer periphery thereof. This gear 246 is drivingly associated with the tumbler 210, and is engaged with the gear teeth of the longitudinal gear rack 240 of the rack member 236. The tumbler 210 also has a pair of diametrically oppositely positioned apertures 248, which apertures define a second optical axis (i.e., indicated with numeral 248') of the tumbler 210. This second optical axis is generally perpendicular to the first optical axis of the tumbler 210 with the lenses 208 and 212.

As will be seen, the tumbler 210 is supported for pivotal motion within the housing base portion 146' between a first position having the first optical axis of the tumbler member 210 aligned with axis 199 of the lens assembly 12, and a second position having the second optical axis (i.e., the axis through apertures 248) aligned with the axis 199. Viewing FIG. 5, it is seen that at the transverse plane marked with the numeral 210" (which is a plane coincident with the pivotal axis 210' of the tumbler member 210), the base housing portion 146' has an effective inner diameter indicated with the circle 146". It is seen that the tumbler member 210 (including lenses 208 and 212, as well as cell 214) has a length fitting within the circle 146". Thus, the tumbler member 210 may pivot from the longitudinally aligned position seen in FIGS. 4 and 5 to a position 90 degrees from this position, and in which the apertures 248 allow infrared radiation to pass through the tumbler member 210 to the fifth lens 216.

In operation, when a user desires to change the field of view of the thermal imaging device 10, the FOV ring 226 is rotated, thereby rotating the drive helix 230. As the drive helix 230 rotates, the threads 238 engage with the thread surface 234 and axially (i.e., longitudinally) translates the rack 236. As the rack 236 moves axially, the rack gear section 240 engages with the gear 246, thereby rotating the gear 246 and tumbler 210 through approximately 90 degrees. The FOV ring 226 is rotated through about 30 degrees in one direction until so that the tumbler 210 rotates approximately 90 degrees in a corresponding direction. Dependent upon the direction of rotation of the FOV ring 226, the tumbler 210 is moved so that one of its first and second optical axes aligns with the axis 199 of the assembly 12. In the second position for the tumbler 210, the infrared radiation 14 passing through the telescope module 12 does not pass through the third and the fourth lens 208 and 212, but passes through the apertures 248.

With continued reference to FIGS. 4 and 6, the FOV change mechanism 228 further includes a limiting key 250. This limiting key 250 includes a pair of circumferentially spaced apart lugs 250' (best seen in FIG. 4). This limiting key 250 in cooperation with a stop boss 252 projecting radially inwardly from the inner periphery of the FOV ring 226 limits the possible rotational movement of the FOV ring 226 to about 30 degrees of rotation about the base housing portion 146'.

Figure 7:
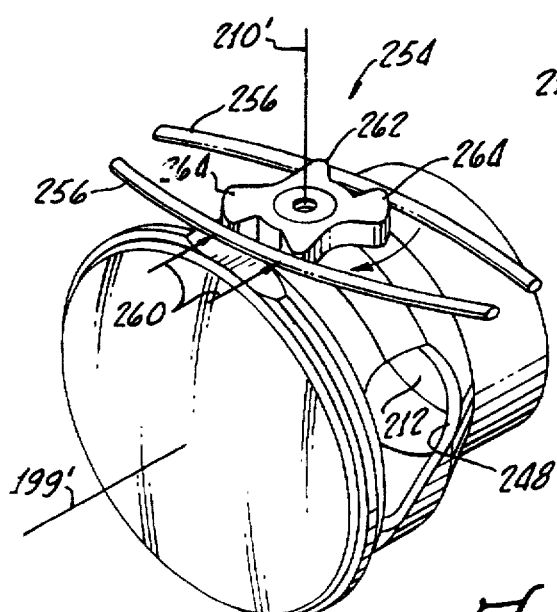

With additional reference to FIG. 7, the FOV change mechanism 228 further includes an optical alignment mechanism 254 including pair of spring rods 256 and a disk-like detent member 258 carried by and drivingly associated with the tumbler member 210 diametrically opposite to the gear 246. The detent member 258 is received between the spring rods 256 near the center of these rods. The outer ends of the rods 256 are each carried in respective bores (not seen in the drawing Figures) defined by the base housing portion 146'. Accordingly, with the detent member 258 positioned between the spring rods 256, the rods 256 are urged apart and provide inward force on the detent 258, as shown by arrows 260, to yieldably hold the tumbler 210 in either one of two possible pivotal positions. As explained, these two possible positions are the first and second positions for the tumbler member 210 with its first and second axis respectively aligned with the axis 199.

The detent member 258 has a pair of generally opposed projecting stops 262 and a pair of generally opposed arcuate projections 264. One of the stops 262 and a corresponding one of the projections 264 define a "side" for the detent member 258, which sides are generally parallel to the first optical axis of the third and fourth lenses 208 and 212, and to the second optical axis of the apertures 248, with the arcuate projections 264 forming diagonal corners of the detent member 258. Therefore, as shown in FIG. 7, when the tumbler 210 is positioned for a wide field of view, the tumbler 210 is held in such a position with the spring rods 256 applying force to a corresponding pair of stops 262 and projections 264 (i.e., sides of the detent member 258), such that the first optical axis of the tumbler 210 is aligned with the optical axis 199 of the telescope module 12.

Figure 8:
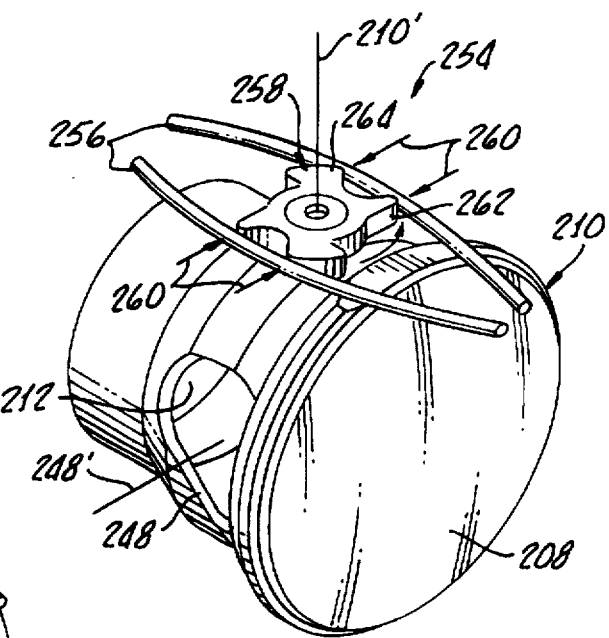
FIGS. 7 and 8 are perspective views of a field-of-view tumbler according to the present invention shown in two different field-of-view positions.

With additional reference to FIG. 8, when a user desires to observe a scene with a narrower field of view and greater telescopic power, the user rotates the FOV ring 226 (see FIGS. 5 and 6) to its other position. As the FOV ring 226 rotates about the optical axis 199 of the telescope module 12, the tumbler 210 in the exemplary embodiment shown rotates clockwise (as seen in FIGS. 7 and 8), from the position of FIG. 7 to that of FIG. 8, with the arcuate projections 264 urging the spring rods 256 outwardly slightly. As the tumbler 210 continues to rotate, the first optical axis of the third and fourth lenses 208 and 212 moves perpendicularly to the axis 199, and the second axis of apertures 248 comes into alignment with axis 199, as is seen in FIG. 8. In this second position for the tumbler 210, the projections 264 have slid along a respective one of the spring rods 256 so that one of the stops 262 contacts a respective one of the spring rods 256. Thus, the two positions for the tumbler member 210 are determined cooperatively by the detent member 258 and the spring rods 256.

Furthermore, by the arrangement of the arcuate projections 264, when the tumbler 210 has rotated approximately 45 degrees between either of its positions, the tumbler 210 is then urged through the remaining 45 degrees of its pivotal movement by the combination of the rack member 236 moving axially and the force (arrows 260) from the spring rods 256 to align one of the first and second optical axes with the optical axis 199 of the module 12.

The telescope module 12 further includes means for determining whether a narrow or a wide field of view has been selected. A magnet 266 is disposed on an arm portion 267 of the rack member 236. As the rack 236 moves longitudinally, the magnet 266 moves accordingly and either approaches or moves away from an inner surface 218' of the rear cap 218 (best seen viewing FIG. 5). When the magnet 266 is proximate to the surface 218', it actuates a particular one of the reed switches 178. Which one of the reed switches is actuated depends upon which one of the various telescope assemblies 12 is installed on the device 10. Moreover, in addition to the magnet 176 disposed on the conical rear portion 148 of the housing 146 to particularly identify a particular telescope assembly 12, the internal movable magnet 266 actuates one of the reed switches 178 of the reed switch assembly 162 to inform the device of which field of view has been selected by the user of the device. When the magnet 266 is in a forward position, the magnet 266 is spaced from the conical rear portion 148 and does not present a magnetic field of sufficient strength to actuate the particular one of the reed switches 178. However, when the FOV ring 226 is rotated to its wide field of view position, seen in FIGS. 5 and 7, then the rack member 236 moves rearwardly, the magnet 266 moves to a position adjacent to an inner surface 218' of the rear cap 218 which outwardly defines the conical portion 148; and in this position the magnet 266 presents a sufficient magnetic field to project through the rear cap 218 and the front wall of the housing 130 of the device 10 to the particular one of the reed switches 178 which aligns with the magnet 266. Thus, the reed switch 178 is actuated and the imaging device 10 not only identifies which one (if any) of the telescopic lens modules 12 is installed by a user but also identifies which power setting and field of view setting is selected by the user.

In order to provide a complete description of the telescope module 12 having a changeable field-of-view feature according to an exemplary embodiment of the thermal imaging device 10 of the present invention, further reference is made to FIG. 4 which illustrates the individual components of the telescope module 12. A plurality of O-rings 270A to 270E are provided between adjacent components of the assembly 12 to ensure that dust, moisture, or the like does not enter the interior of the module 12. Additionally, a spacing and decoupling ring 272 may be disposed between the focus ring 220 and the FOV ring 226 so as to facilitate respective independent rotational movements thereof. Also, an end stop ring 274 may be disposed within the rear cap 218 so as to facilitate the coupling between the rear cap 218 and the base housing 146.

Further viewing FIGS. 4 and 5, it is seen that the tumbler member is supported for pivotal movement within the base housing portion 146' by a pair of diametrically opposite screws 276, each with a respective pivot member 278 received into a matching hole 280 defined by the base housing portion 146'.

While the present invention has been depicted, described, and is defined by reference to a particularly preferred embodiment of the invention, such reference does not imply a limitation of the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only and is not exhaustive of the scope of the invention. Consequently, the invention is intended to be limited only by the spirit and scope of the appended claims, giving full cognizance to equivalents in all respects.

What is claimed is:

1. A thermal imaging device including a housing having an optical aperture for receiving thermal infrared radiation from a scene, and responsively providing a visible image replicating the scene, said thermal imaging device comprising: a telescopic variable-power lens assembly cooperable with said imaging device at said optical aperture for conducting thermal infrared radiation from the scene to said thermal imaging device, said lens assembly including a lens housing passing the thermal infrared radiation from the scene along an optical axis to said imaging device, a movable member mounted within said lens housing, said movable member carrying at least one lens, in a first position of said movable member said at least one lens being in said optical axis so that the thermal infrared radiation passing to said imaging device passes through said at least one lens, and said movable member in a second position disposing said at least one lens out of said optical axis;

wherein said relatively movable member is configured as a tumbler member pivotally supported within said lens housing;

wherein said lens assembly includes a field-of-view ring rotatable about said optical axis of said lens housing, and actuating linkage structure extending between said field-of-view ring and said tumbler member for effecting pivoting movement of said tumbler member between first and second positions in response to respective opposite rotations of said field-of-view ring, said tumbler member aligning said first and second optical axes thereof with said optical axis of said lens housing in respective ones of said first and second positions.

2. The thermal imaging device of claim 1 wherein a substantially 30-degree rotation of said field-of-view ring pivots said tumbler member approximately 90 degrees between said first and second positions thereof.

3. The thermal imaging device of claim 1 wherein said actuating linkage structure includes:

a drive helix ring coupled to said field-of-view ring, rotational about said lens housing, and having an inner thread surface formed thereon;

a gear member drivingly mounted on said tumbler member; and a rack member having a thread section engageable with said inner thread surface of said drive helix ring, and a rack gear section engaging with said gear member;

said lens housing supporting said rack member for axial relative movement, and rotationally supporting said tumbler member.

4. The thermal imaging device of claim 3 wherein said drive helix ring defines a serrate outer periphery surface, and said field-of-view ring defines a matching serrate inner periphery surface drivingly engageable with said serrate surface of said drive helix ring, said drive helix ring being concentrically mounted rotationally upon said lens housing and carrying said field-of-view ring.

5. The thermal imaging device of claim 3 wherein said field-of-view ring has at least one lever part projecting radially outwardly from an outer periphery thereof.

6. The thermal imaging device of claim 3, wherein said field-of-view ring includes a stop boss abutting a limiting key mounted to said lens housing to limit rotational movement of said field-of-view ring between respective first and said second positions therefor.

7. The thermal imaging device of claim 1 wherein:

said imaging device further includes a magnetically-responsive sensor, and said telescopic variable-power lens assembly further includes a magnetic member moving between respective first and second positions in response to movements of said movable member, said magnetic member affecting said magnetically-responsive sensor of said imaging device in only one of said first and second positions, thereby to indicate a field of view of said lens assembly to said imaging device.

8. The thermal imaging device of claim 1 wherein said movable member is associated with an optical alignment mechanism for releasably retaining said movable member in either one of said first and said second positions.

9. A thermal imaging device including a housing having an optical aperture for receiving thermal infrared radiation from a scene, and responsively providing a visible image replicating the scene, said thermal imaging device comprising: a telescopic variable-power lens assembly cooperable with said imaging device at said optical aperture for conducting thermal infrared radiation from the scene to said thermal imaging device, said lens assembly including a lens housing passing the thermal infrared radiation from the scene along an optical axis to said imaging device, a movable member mounted within said lens housing, said movable member carrying at least one lens, in a first position of said movable member said at least one lens being in said optical axis so that the thermal infrared radiation passing to said imaging device passes through said at least one lens, and said movable member in a second position disposing said at least one lens out of said optical axis;

wherein said movable member is associated with an optical alignment mechanism for releasably retaining said movable member in either one of said first and said second positions;

wherein said optical alignment mechanism includes:
a pair of spaced spring rods mounted in said lens housing; and
a detent member operatively coupled with said movable member and positioned between said pair of spring rods;
said pair of spring rods applying a restraining and restoring force to said detent member.

10. The thermal imaging device of claim 9 wherein said detent member includes a pair of arcuate projections each engageable with a respective one of said pair of spring rods during movement of said moveable member between said first and said second positions.

11. A thermal imaging device including a main housing having an optical aperture, said thermal imaging device receiving thermal infrared radiation from a viewed scene through said optical aperture and responsively providing a visible image replicating the viewed scene, said thermal imaging device comprising:

a focusing lens assembly releasably attachable to said main housing at said optical aperture for receiving thermal infrared radiation from said viewed scene and for providing said infrared radiation to said thermal imaging device, said lens assembly including:

a housing through which said infrared radiation is passable;

a plurality of lenses mounted within said housing, said lenses defining an optical axis of said lens assembly; and a field-of-view-change mechanism for selectively changing between a wide field of view and a narrow field of view, said field-of-view-change mechanism including:
a field-of-view (FOV) ring rotatably mounted on said housing, said FOV ring having a rotational axis;
a tumbler rotatably mounted within said housing, said tumbler having a rotational axis, said tumbler including at least one FOV lens mounted therewithin, said tumbler having a first optical axis and a second optical axis defined therethrough, said FOV lens being aligned with one of said first or said second optical axis, said first optical axis defining a first field of view and said second optical axis defining a second field of view, said tumbler being selectively positioned in a first position wherein a first optical axis is substantially aligned with said optical axis of said lens assembly and in a second position wherein a second optical axis is substantially aligned with said optical axis of said lens assembly; and
gearing coupled to said FOV ring and said tumbler, said gearing for translating rotational movement of said FOV ring about said rotational axis thereof to rotational movement of said tumbler about said rotational axis thereof.

12. A thermal imaging device including a main housing having an optical aperture, said thermal imaging device receiving thermal infrared radiation from a viewed scene through said optical aperture and responsively providing a visible image replicating the viewed scene, said thermal imaging device comprising:

a focusing lens assembly releasably attachable to said main housing at said optical aperture for receiving thermal infrared radiation from said viewed scene and for providing said infrared radiation to said thermal imaging device, said lens assembly including:

a housing through which said infrared radiation is passable;

a plurality of lenses mounted within said housing, said lenses defining an optical axis of said lens assembly; and a field-of-view-change mechanism for selectively changing between a wide field of view and a narrow field of view, said field-of-view-change mechanism including:
a field-of-view (FOV) ring rotatably mounted on said housing, said FOV ring having a rotational axis;

a tumbler rotatably mounted within said housing, said tumbler having a rotational axis, said tumbler including at least one FOV lens mounted therewithin, said tumbler having a first optical axis and a second optical axis defined therethrough, said FOV lens being aligned with one of said first or said second optical axis, said first optical axis defining a first field of view and said second optical axis defining a second field of view, said tumbler being selectively positioned in a first position wherein a first optical axis is substantially aligned with said optical axis of said lens assembly and in a second position wherein a second optical axis is substantially aligned with said optical axis of said lens assembly; and gearing coupled to said FOV ring and said tumbler, said gearing for translating rotational movement of said FOV ring about said rotational axis thereof to rotational movement of said tumbler about said rotational axis thereof;

wherein said rotational axis of said FOV ring is substantially perpendicular to said rotational axis of said tumbler.

13. The thermal imaging device of claim 12 wherein said first optical axis of said tumbler is substantially perpendicular to said second optical axis of said tumbler.

14. A variable-power telescopic lens assembly for use with a thermal imaging device, said thermal imaging device being adapted to receive thermal infrared radiation from a scene and responsively providing a visible image replicating the scene, said telescopic lens assembly comprising:

a lens housing passing thermal infrared radiation from the scene along an optical axis to the imaging device, a movable member mounted within said lens housing, said movable member carrying at least one lens, in a first position of said movable member said at least one lens being in said optical axis so that the thermal infrared radiation passing to the imaging device passes through said at least one lens, and said movable member in a second position disposing said at least one lens out of said optical axis;

wherein said relatively movable member is configured as a tumbler member pivotally supported within said lens housing;

wherein said lens assembly includes a field-of-view ring rotatable about said optical axis of said lens housing, and actuating linkage structure extending between said field-of-view ring and said tumbler member for effecting pivoting movement of said tumbler member between first and second positions in response to respective opposite rotations of said field-of-view ring, said tumbler member aligning said first and second optical axes thereof with said optical axis of said lens housing in respective ones of said first and second positions;

wherein said actuating linkage structure includes:
a drive helix ring coupled to said field-of-view ring, rotatable about said lens housing, and having an inner thread surface formed thereon;
a gear member drivingly mounted on said tumbler member; and
a rack member having a thread section engageable with said inner thread surface of said drive helix ring, and a rack gear section engaging with said gear member;
said lens housing supporting said rack member for axial relative movement, and rotationally supporting said tumbler member.

15. The thermal imaging device of claim 14 wherein said drive helix ring defines a serrate outer periphery surface, and said field-of-view ring defines a matching serrate inner periphery surface drivingly engageable with said serrate surface of said drive helix ring, said drive helix ring being concentrically mounted rotationally upon said lens housing and carrying said field-of-view ring.

16. The thermal imaging device of claim 15 wherein said variable-power telescopic lens assembly further includes a magnetic member moving between respective first and second positions in response to movements of said movable member.

* * * * *